US011750026B2

United States Patent
Smith et al.

(10) Patent No.: US 11,750,026 B2
(45) Date of Patent: Sep. 5, 2023

(54) SYSTEM FOR HARVESTING POWER FROM A CURRENT TRANSFORMER

(71) Applicant: NOVINIUM, LLC, Kent, WA (US)

(72) Inventors: Jacob Smith, Kent, WA (US); Kenneth Taylor, Kent, WA (US); Weston Philips Chapin Ford, Seattle, WA (US)

(73) Assignee: NOVINIUM, LLC, Wilmington, DE (US)

( * ) Notice: Subject to any disclaimer, the term of this patent is extended or adjusted under 35 U.S.C. 154(b) by 0 days.

(21) Appl. No.: 17/307,490

(22) Filed: May 4, 2021

(65) Prior Publication Data

US 2021/0351617 A1    Nov. 11, 2021

Related U.S. Application Data

(60) Provisional application No. 63/020,455, filed on May 5, 2020.

(51) Int. Cl.
| H02J 50/00 | (2016.01) |
| H01F 38/14 | (2006.01) |
| H02M 7/219 | (2006.01) |
| H02J 50/10 | (2016.01) |

(52) U.S. Cl.
CPC ............ *H02J 50/001* (2020.01); *H01F 38/14* (2013.01); *H02J 50/10* (2016.02); *H02M 7/219* (2013.01)

(58) Field of Classification Search
CPC .............................. H01F 38/00; H02J 50/001
See application file for complete search history.

(56) References Cited

U.S. PATENT DOCUMENTS

| 3,777,217 | A |  | 12/1973 | Groce et al. |
| 4,788,620 | A | * | 11/1988 | Scott ........................ H02H 3/00 361/87 |
| 5,181,026 | A |  | 1/1993 | Granville |
| 5,550,476 | A |  | 8/1996 | Lau et al. |
| 6,822,576 | B1 |  | 11/2004 | Feight et al. |
| 7,633,262 | B2 |  | 12/2009 | Lindsey et al. |
| 8,594,956 | B2 |  | 11/2013 | Banting et al. |
| 9,984,818 | B2 |  | 5/2018 | Rumrill |
| 10,684,031 | B2 |  | 6/2020 | Steele et al. |
| 2006/0202664 | A1 |  | 9/2006 | Lindsey et al. |
| 2010/0084920 | A1 |  | 4/2010 | Banting et al. |
| 2010/0085036 | A1 |  | 4/2010 | Banting et al. |
| 2012/0039062 | A1 |  | 2/2012 | McBee et al. |
| 2012/0236611 | A1 |  | 9/2012 | Alexandrov et al. |
| 2014/0160820 | A1 | * | 6/2014 | McKinley ............... H01F 38/32 363/126 |

(Continued)

OTHER PUBLICATIONS

International Search Report and Written Opinion, dated Aug. 18, 2021, receive in International Application No. PCT/US2021/030659.

*Primary Examiner* — Rexford N Barnie
*Assistant Examiner* — Joseph N Inge
(74) *Attorney, Agent, or Firm* — Davis Wright Tremaine LLP; George C. Rondeau, Jr.; Heather M. Colburn (57) ABSTRACT

An assembly for harvesting power from one or more power cables. The assembly includes a current transformer operable to harvest power from the one or more power cables and a controller operable to control an amount of power harvested by the current transformer.

26 Claims, 6 Drawing Sheets

(56) References Cited

U.S. PATENT DOCUMENTS

| | | | |
|---|---|---|---|
| 2014/0191730 A1* | 7/2014 | Ivanov | H02N 2/181 |
| | | | 320/145 |
| 2015/0054610 A1* | 2/2015 | Cook | H01F 27/06 |
| | | | 336/132 |
| 2015/0108945 A1* | 4/2015 | Yan | H02J 7/0042 |
| | | | 320/108 |
| 2015/0357907 A1* | 12/2015 | Koo | H02M 1/32 |
| | | | 363/126 |
| 2015/0357917 A1* | 12/2015 | Okamatsu | H02M 3/1582 |
| | | | 323/271 |
| 2016/0116505 A1 | 4/2016 | Kast et al. | |
| 2017/0199533 A1 | 7/2017 | McCollough | |
| 2019/0190319 A1* | 6/2019 | Kawamae | H02M 7/46 |
| 2020/0294694 A1 | 9/2020 | Bertini et al. | |
| 2020/0295545 A1 | 9/2020 | Bertini et al. | |

\* cited by examiner

SYSTEM FOR HARVESTING POWER FROM A CURRENT TRANSFORMER

CROSS REFERENCE TO RELATED APPLICATION(S)

This application claims the benefit of U.S. Provisional Application No. 63/020,455, filed on May 5, 2020, which is incorporated herein by reference in its entirety.

BACKGROUND OF THE INVENTION

Field of the Invention

The present invention is directed generally to harvesting energy from a current transformer ("CT") to charge a battery or some other energy storage device or to provide operating power for an electronic device.

Description of the Related Art

Often times, electronic devices used to monitor, and transmit data, or perform some other type of operational function are installed remotely with little to no access. Such electronic devices, like those described in U.S. Pat. No. 10,684,031, U.S. patent application Ser. No. 16/818,941, and U.S. patent application Ser. No. 16/818,928, will be referred to as being remotely installed electronic devices. When access to remotely installed electronic devices can be achieved, it may be prohibitively expensive. Further, many remotely installed electronic devices need to operate for long periods of time with no intervention. This time period could be months to many years. Providing power to the remotely installed electronic devices is one of the most critical and difficult aspects of operating remotely installed electronic devices long term.

Several methods currently exist for providing power to a remotely installed electronic device. For example, the remotely installed electronic device may be plugged into an alternating current ("AC") power source (e.g., an AC receptacle). By way of another example, a protective jacket of a power cable (e.g., an AC mains) may be cut open to expose a conductor and the electronic device electrically connected to the conductor inside the cable. The remotely installed electronic device rectifies the AC voltage (usually 120 volts in the U.S.) to a direct current ("DC") voltage. The remotely installed electronic device also converts and regulates the DC voltage with a buck, boost, or single-ended primary-inductor ("SEPIC").

Unfortunately, remote device locations, such as those where remotely installed electronic devices operate, usually lack AC receptacles into which a plug or a power cord of the remotely installed electronic device may be plugged to be connected to the AC mains voltage. To add this receptacle or hardwire a power cord of a remotely installed electronic device to the AC mains sometimes requires a shutdown of that circuit to avoid the installer having to work in a dangerous situation with live AC circuits. In the case where these installations need to take place before the power meter on main-branch circuits (e.g., circuits operating at 5 Kilovolts ("kV") to 69 kV), there is additional cost and inconvenience. Many times these main-branch circuit modifications require lane closures, permits, and large crews of skilled tradesmen to perform the installation of step-down transformers to make the connection. These additional steps and restrictions can add tremendous cost to remote device installations. In addition to the cost aspect, the disconnection of power to households and businesses while this work is being performed is problematic from a customer satisfaction perspective as it causes a tremendous amount of inconvenience to customers.

As an alternative, batteries may be used to power remotely installed electronic devices. However, after some amount of time, batteries need to be replaced or recharged. Due to the remote installation aspect, battery replacement is difficult and cost prohibitive. Batteries offer only a short-term power source unless they are recharged. Recharging typically is handled through a direct connection to an AC circuit requiring the items aforementioned with all the same constraints and execution issues related to installing the remote device with AC power.

BRIEF DESCRIPTION OF THE SEVERAL VIEWS OF THE DRAWING(S)

Various embodiments in accordance with the present disclosure will be described with reference to the following drawings.

Like reference numerals have been used in the figures to identify like components.

DETAILED DESCRIPTION OF THE INVENTION

Many remotely installed electronic devices have some type of AC mains supply cables in close proximity to the installation. These AC mains supply cables typically do not have receptacles connected thereto, which would allow the remotely installed electronic devices simply to be plugged into the receptacles and to receive power therefrom. Therefore, in some situations, the AC mains supply cables need to be de-energized so that a protective jacket of an AC mains supply cable can be cut open to expose a conductor and the remotely installed electronic devices may be electrically connected to the conductor, which causes controlled outages. In other situations, in which the AC mains supply cables are not de-energized, skilled labor is required to perform the installation, which presents workplace hazards. In other words, prior art methods of using the AC mains to provide power to remotely installed electronic devices may have tremendous costs in total.

Figure 1A:
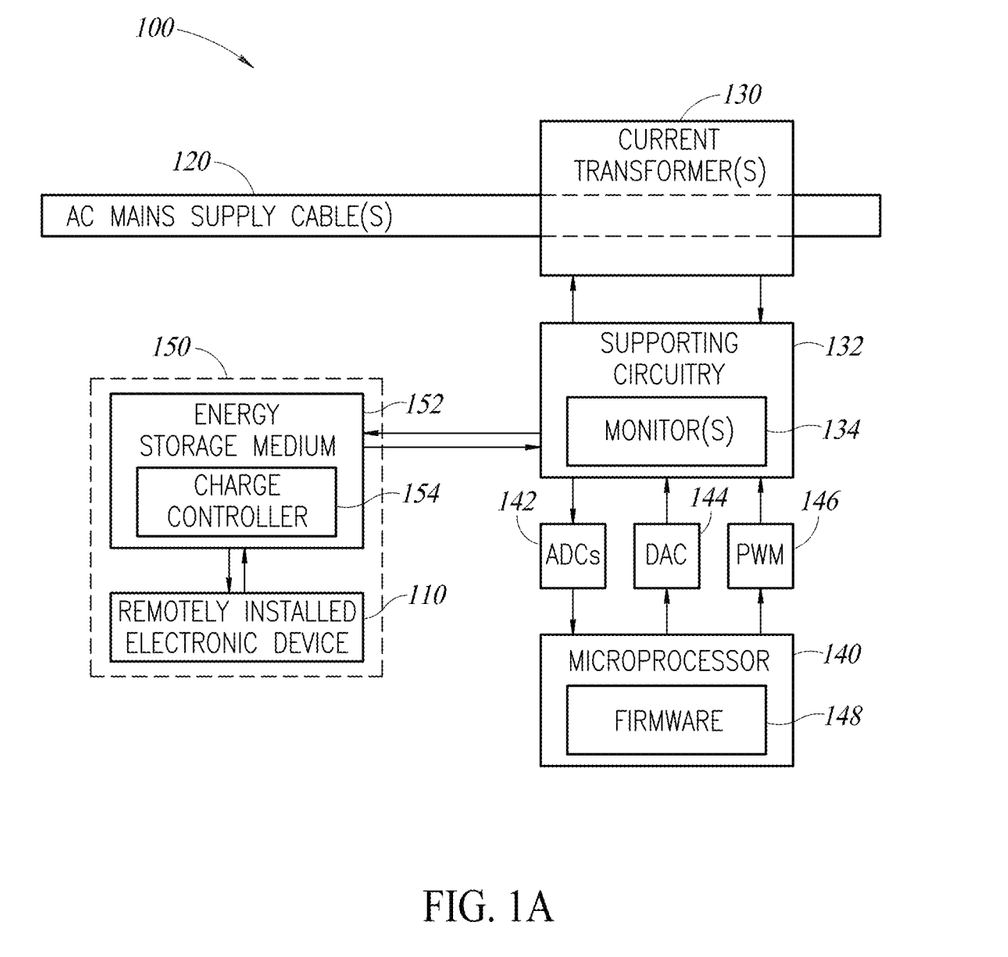
FIG. 1A is a block diagram of an example system that includes a remotely installed electronic device, one or more AC mains supply cables, one or more current transformers ("CTs"), and supporting circuitry.
Figure 3:
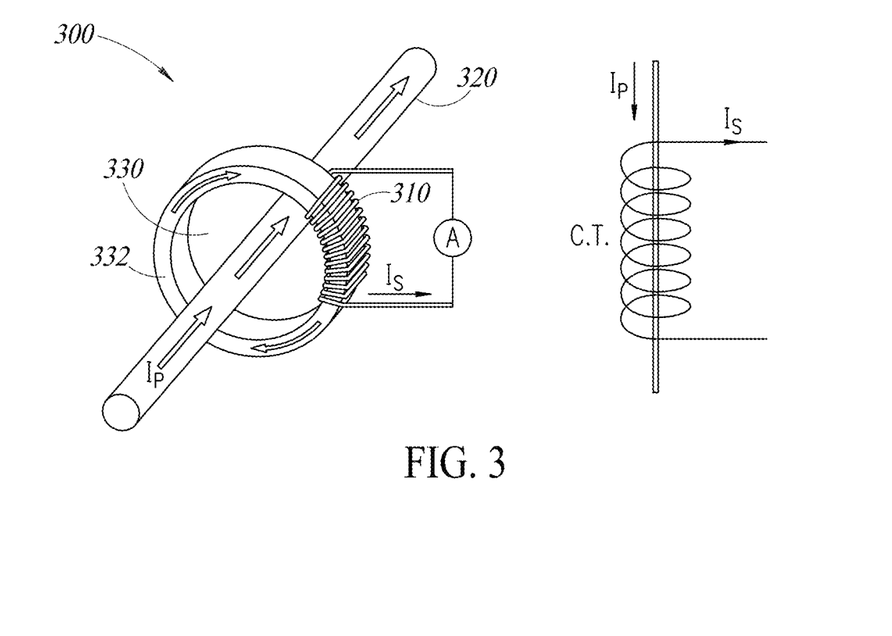
FIG. 3 is an illustration of an example CT.

FIG. 1A is a block diagram of a system 100 that uses one or more current transformers ("CT(s)") 130 to harvest power from a main-branch AC circuit including one or more AC mains supply cables 120. The power harvested is used to power one or more remotely installed electronic devices (e.g., a remotely installed electronic device 110), which may each be characterized as being a component of the system 100. Referring to FIG. 3, each of the CT(s) 130 includes a magnet core 332, a secondary winding 310, and a primary winding or conductor 320. The primary conductor 320 may be implemented as the AC mains supply cable(s) 120 (see FIG. 1A). Referring to FIG. 1A, because of a non-galvanic connection between the CT(s) 130 and the AC mains supply cable(s) 120, the CT(s) 130 may offer certain advantages over other prior art methods of harvesting power from a main-branch AC circuit. However, it may be beneficial to optimize each of the CT(s) 130 for specific applications by adjusting the magnet core 332 (see FIG. 3) and/or the secondary winding 310 (see FIG. 3) to match power draw demands of the remotely installed electronic device 110 to the load carried by the main-branch AC circuit. But, this can be difficult because main-branch AC circuits may see daily or seasonal load fluctuations that vary from less than 1 amp to over 600 amps. Under these circumstances, a CT optimized to harvest power from a main-branch AC circuit with an expected load of 10 amps, for example, may become over saturated and fail to operate if the load actually experienced is over 100 amps.

To avoid problems caused by load fluctuations in the AC mains supply cable(s) 120, the system 100 includes an active system that helps optimize power output to the remotely installed electronic device 110. The active system of the system 100 includes supporting circuitry 132, a microcontroller or microprocessor 140, one or more analog-digital converters ("ADC(s)") 142, a digital-analog converter ("DAC") 144, and a pulse width modulation ("PWM") control 146. In some embodiments, the PWM control 146 may be used in place of the DAC 144. The microprocessor 140 is configured to execute custom firmware 148. The supporting circuitry 132 includes one or more monitors 134 configured to monitor various parameters of the supporting circuitry 132 and send monitoring signals encoding the values of those parameters to the microprocessor 140.

The CT(s) 130 is/are passively attached to the existing AC mains supply cable(s) 120 in close proximity to the remotely installed electronic device 110. In the embodiment illustrated, the CT(s) 130 and the supporting circuitry 132 supply power to an output load 150. In the embodiment illustrated, the output load 150 includes an energy storage medium 152 and the remotely installed electronic device 110. The energy storage medium 152 supplies power to the remotely installed electronic device 110. The energy storage medium 152 may be implemented as one or more batteries, one or more other energy storage device, and the like. In alternate embodiments, the output load 150 may be the remotely installed electronic device 110 and the supporting circuitry 132 may be configured to supply power directly to the remotely installed electronic device 110. By way of yet another non-limiting example, the output load 150 may be the energy storage medium 152, which simply stores power received from the CT(s) 130 and the supporting circuitry 132. The energy storage medium 152 may include a charge controller 154 (e.g., like the charge controller used by many battery technologies).

The CT(s) 130 and the supporting circuitry 132 harvest power from the existing AC mains supply cable(s) 120, rectify that power, boost the voltage to a usable level, and regulate that voltage to provide a desired amount of power to the output load 150. The desired amount of power may be sufficient to operate the remotely installed electronic device 110, and/or charge the energy storage medium 152 (e.g., a battery, or other energy storage device). The microprocessor 140 executing the firmware 148 may be configured to maximize the power collected and use that power efficiently.

Figure 1B:
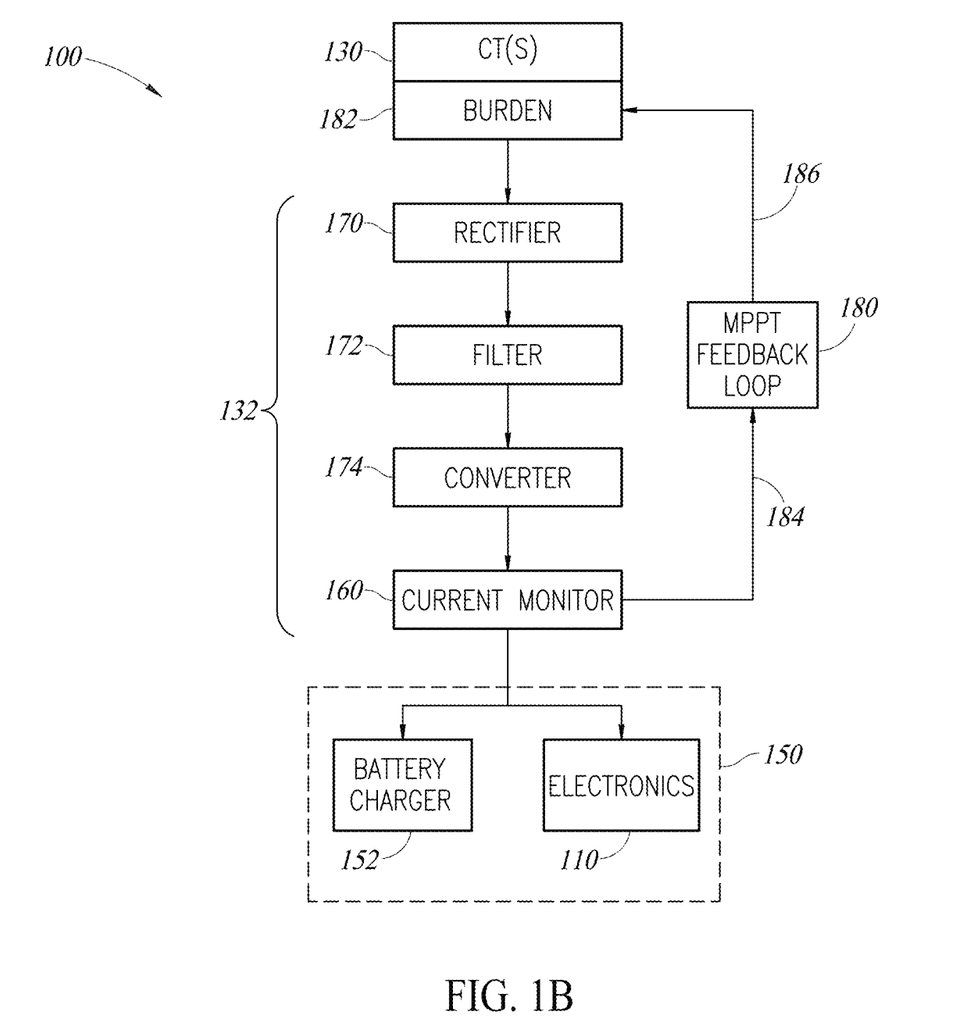
FIG. 1B is a diagram illustrating power flowing through the system of FIG. 1A.

FIG. 1B is a diagram illustrating power flowing through the system 100. In the embodiment illustrated, the monitor(s) 134 (see FIG. 1A) include an output current monitor 160 and the supporting circuitry 132 includes a rectifier 170, a filtering circuit 172, and a converter circuit 174. The converter circuit 174 may be implemented as a buck converter circuit or a boost converter circuit. The output current monitor 160 is configured to measure power output by the converter circuit 174 and transmit an output current signal 184 encoding the output power to the microprocessor 140 (see FIG. 1A).

In the system 100, the microprocessor 140 (see FIG. 1A) uses a feedback loop 180 to determine a variable burden resistance or load 182 component of the CT(s) 130 that achieves a maximum power point. The microprocessor 140 (see FIG. 1A) receives the output current signal 184 from the output current monitor 160 and uses the output current signal 184 to determine a calculated amount of burden load. The microprocessor 140 (see FIG. 1A) sends a load control signal 186 to the CT(s) 130 instructing each of them to set the burden load 182 to the calculated amount of burden load. The CT(s) 130 are configured to receive and implement the load control signal 186.

The microprocessor 140 (see FIG. 1A) may use any of several methods to determine the maximum power point based on the output current signal 184. For example, the microprocessor 140 (see FIG. 1A) may use an iterative algorithm which first changes the burden load 182 by a small amount, then measures the resulting change in output power. If the output power increases, the burden load 182 is changed in the same direction. If the output power decreases, the burden load 182 is changed in the opposite direction. This process is repeated until changes in both directions result in decreased power. Another method periodically sweeps the burden load 182 over a large range, measures power points at each step, and calculates the maximum power point from a curve fit through the measured power points.

Figure 2:
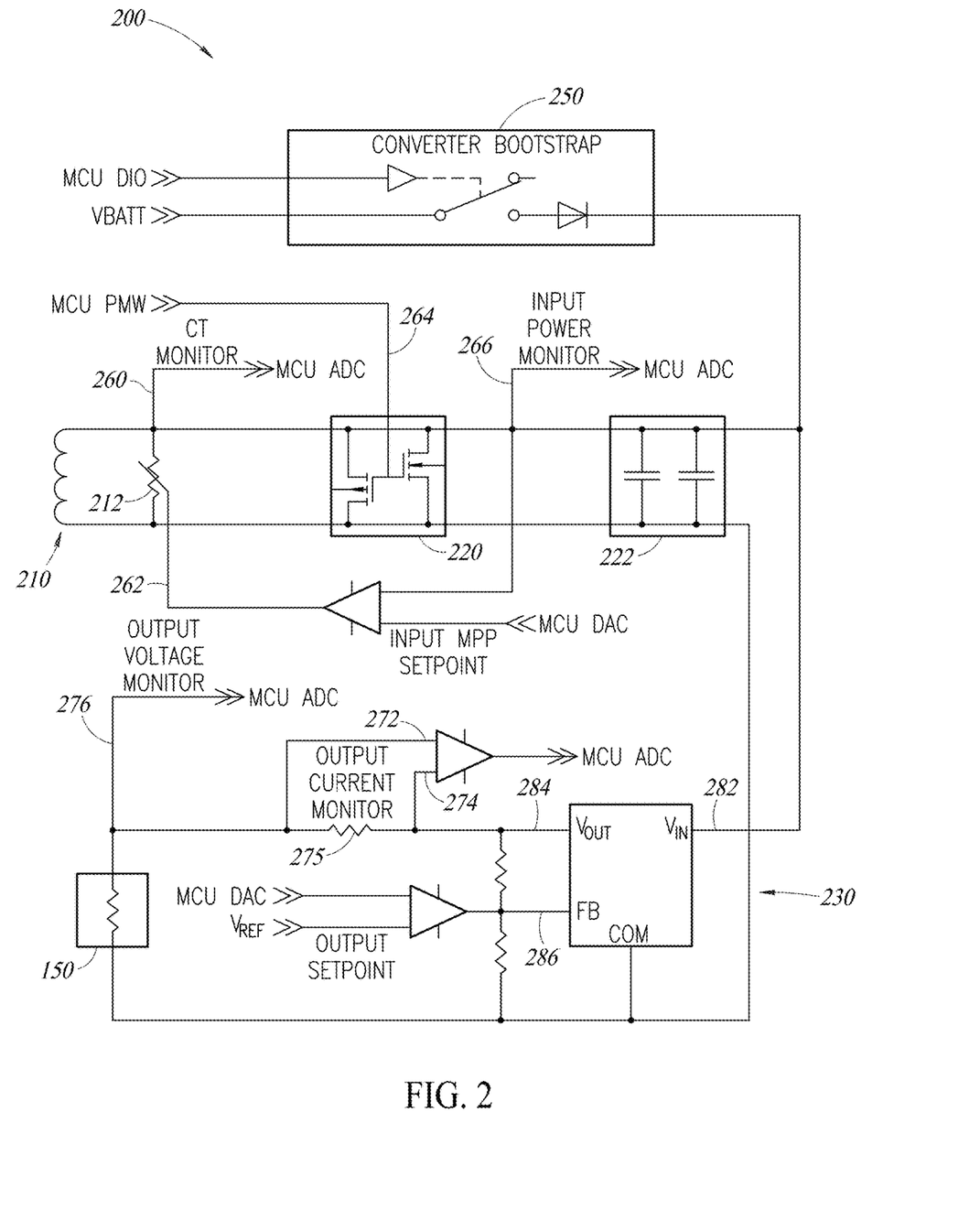
FIG. 2 is a functional block diagram of an assembly that includes the supporting circuitry and at least one of the CT(s) of the system of FIG. 1A.

FIG. 2 is a functional block diagram of an assembly 200 that includes the supporting circuitry 132 and one of the CT(s) 130 (see FIG. 1A), identified in FIG. 2 by reference numeral 210. In FIG. 2, the assembly 200 is illustrated as including only the CT 210. However, alternatively, the assembly 200 may include multiple CTs (e.g., each like the CT 210) wired in a series configuration, a parallel configuration, or a series-parallel configuration (depending on the application). The CT 210 may be implemented using any suitable configuration. By way of non-limiting examples, the CT 210 may be implemented as a split core CT, a solid core CT, and the like.

In FIG. 2, the rectifier 170 (see FIG. 1B) has been implemented as a rectifier 220, the filtering circuit 172 (see FIG. 1B) has been implemented as a filtering circuit 222, the converter circuit 174 (see FIG. 1B) has been implemented as boost converter circuitry 230, and the burden load 182 (see FIG. 1B) has been implemented as an active burden load 212. The monitor(s) 134 (see FIG. 1A) include the output current monitor 160 (see FIG. 1B), an output voltage monitor (not shown), a CT monitor (not shown), and an input power monitor (not shown). In FIG. 2, the supporting circuitry 132 (see FIGS. 1A and 1B) includes a boot strap component 250.

As mentioned above, the supporting circuitry 132 (see FIGS. 1A and 1B) is connected to the output load 150 and supplies power thereto. To maximize available power for use by the output load 150, the active burden load 212 is installed across the output terminals of the CT 210. The active burden load 212 is utilized and controlled by the microprocessor 140 (see FIG. 1A). As shown in FIG. 2, a conductor 260 connects the CT 210 to the CT monitor (not shown), which detects a harvested current and sends a CT monitor signal to the ADC(s) 142 (see FIG. 1A). The ADC(s) 142 (see FIG. 1A) convert the analog CT monitor signal to a digital CT monitor signal, which is received by the microprocessor 140 (see FIG. 1A). The microprocessor 140 (see FIG. 1A) uses the digital CT monitor signal as input for a control feedback mechanism (not shown) and/or for monitoring current in the AC mains supply cables 120.

A conductor 262 receives the load control signal 186 (see FIG. 1B) from the DAC 144 (see FIG. 1A), which was generated by the microprocessor 140 (see FIG. 1A). The load control signal 186 (see FIG. 1B) is operable to set the amount of load applied by the active burden load 212 across the output terminals of the CT 210.

As shown in FIG. 2, the rectifier 220 may be implemented as a full wave metal-oxide-semiconductor field-effect transistor ("MOSFET" or "FET") bridge rectifier. The power harvested by the CT 210, in the form of AC voltage and AC current, is rectified by the rectifier 220, which yields a DC output. The gates of the FETs in the rectifier 220 are connected by a conductor 264 to the PWM control 146 (see FIG. 1A), which is connected to the microprocessor 140 (see FIG. 1A). The microprocessor 140 is configured to send a rectifier control signal to the gates of the FETs via the PWM control 146 (see FIG. 1A) and the conductor 264. A conductor 266 is configured to connect the DC output of the rectifier 220 to the input power monitor (not shown), which detects power harvested by the CT 210. The input power monitor (not shown) sends an input monitor signal to the ADC(s) 142 (see FIG. 1A), which convert the input monitor signal to a digital input power monitor signal that is forwarded to the microprocessor 140.

The DC output of the rectifier 220 passes through the filtering circuit 222, which may consist of a single or multiple capacitors in combination with other filtering circuitry, if needed. The other filtering circuitry may include one or more resistors connected in series or in parallel with a downstream load. The filtering circuit 222 reduces noise and/or smooths power supplied to the output load 150 (e.g., batteries, charging circuit, operational electronics, and the like). The filtering circuit 222 may smooth the voltage of the DC output of the rectifier 220 and/or reduce ripples (e.g., caused by the rectifier 220) to a manageable level.

After passing through the filtering circuit 222, the filtered DC power feeds into the boost converter circuitry 230, which includes a feedback circuit implementing the feedback loop 180 (see FIG. 1B). As mentioned above, the feedback loop 180 (see FIG. 1B) is controlled by the microprocessor 140 (see FIG. 1A) in conjunction with the input power (received via the conductor 266) from the active burden load 212. Conductors 272 and 274 are connected across a resistor 275 and connect an output current to the output current monitor 160 (see FIG. 1B), which sends the output current signal 184 (see FIG. 1B) to the ADC(s) 142 (see FIG. 1A). The ADC(s) 142 (see FIG. 1A) convert the output current signal 184 (see FIG. 1B) to a digital output current monitor signal that is forwarded to the microprocessor 140.

The boost converter circuitry 230 includes a boost converter 280. The boost converter circuitry 230 provides power to the output load 150 (e.g., the remotely installed electronic device 110 illustrated in FIG. 1A). A conductor 276 connects an output voltage at the output load 150 to the output voltage monitor (not shown), which detects the output voltage and encodes it in an output voltage signal. The output voltage monitor (not shown) sends the output voltage signal to the ADC(s) 142 (see FIG. 1A), which convert the output voltage signal to a digital output voltage monitor signal that is forwarded to the microprocessor 140. The output load 150 may be a battery or some other type of energy storage device configured to be charged by the assembly 200. By way of another non-limiting example, the output load 150 may be an electronic circuit that receives operating power from the assembly 200.

In extremely low voltage startup situations, the boot strap component 250 may use power from the energy storage medium 152 (see FIG. 1A) and/or another source (e.g., one or more batteries, or some other type of energy storage device) to start up the boost converter circuitry 230 until the boost converter 280 stabilizes.

Referring to FIG. 1A, the microprocessor 140 utilizing the custom firmware 148 monitors the input power (voltage and current) received via the conductor 266 along with the output power (voltage and current) received via the conductors 272-276 and the ADC(s) 142 to determine the maximum power possible when the output load 150 is able to store or use the energy harvested. On the other hand, when the output load 150 is unable to store or use the energy harvested (e.g., when the energy storage medium 152 reaches 100% state of charge ("SoC")), the microprocessor 140 utilizing the custom firmware 148 may adjust the resistance of the active burden load 212 to harvest less power, which causes the CT 210 to operate below the maximum power point. The microprocessor 140 utilizing the firmware 148 controls the feedback loop 180 (see FIG. 1B) connected to the boost converter circuitry 230 (see FIG. 2) via the DAC 144 (see FIG. 1A) in conjunction with the active burden load 212 (see FIG. 2) to achieve that maximum power.

The boost converter 280 has a voltage-in ("Vin") terminal, a voltage-out ("Vout") terminal, a feedback ("FB") terminal, and a common ("COM") terminal. The Vin terminal is connected by a conductor 282 to the input power, which includes the filtered DC power output by the filtering circuit 222 and the output of the boot strap component 250. The Vout terminal supplies the output power to a conductor 284. The DAC 144 (see FIG. 1A) is connected to the FB terminal by a conductor 286. The signal received from the microprocessor 140 (see FIG. 1A) via the DAC 144 (see FIG. 1A) instructs the boost converter 280 with regard to how to modify the input power to achieve a desired amount of power that the Vout terminal outputs to the conductor 284. The COM terminal is connected to ground (e.g., a chassis ground).

Current Transformer (CT)

Referring to FIG. 3, a CT 300 (like the CT 210 illustrated in FIG. 2) is a type of instrument transformer that is designed to produce an alternating current in its secondary winding 310 that is proportional to the current being measured in its primary winding or conductor 320. As mentioned above, the primary conductor 320 may be implemented as the AC mains supply cable(s) 120 (see FIG. 1A). The CT 300 reduces a high current to a much lower current and provides a convenient way of safely monitoring the actual electrical current flowing in the AC mains supply cable(s) 120 (see FIG. 1A) using a standard measurement device. The CT 300 may be used to implement the CT(s) 130 (see FIG. 1A). Thus, the CT 210 may be implemented as the CT 300.

FIG. 3 is an illustration of an example design of the CT 300, which is configured to measure current from a primary circuit. The principal of operation of a basic CT is slightly different from that of an ordinary voltage transformer. Unlike a voltage or power transformer (not shown), the CT 300 consists of only one or very few turns as its primary winding (implemented in FIG. 3 as the primary conductor 320). This primary winding can include either (a) a single flat turn (a coil of heavy duty wire wrapped around the core) or (b) a conductor or bus bar (e.g., the primary conductor 320) placed through a central hole 330 defined in the magnet core 332 as shown in FIG. 3. The magnet core 332 may be implemented as a laminated core of low-loss magnetic material. As shown in FIG. 3, the secondary winding 310 is wound around the magnetic core 332.

Figure 4:
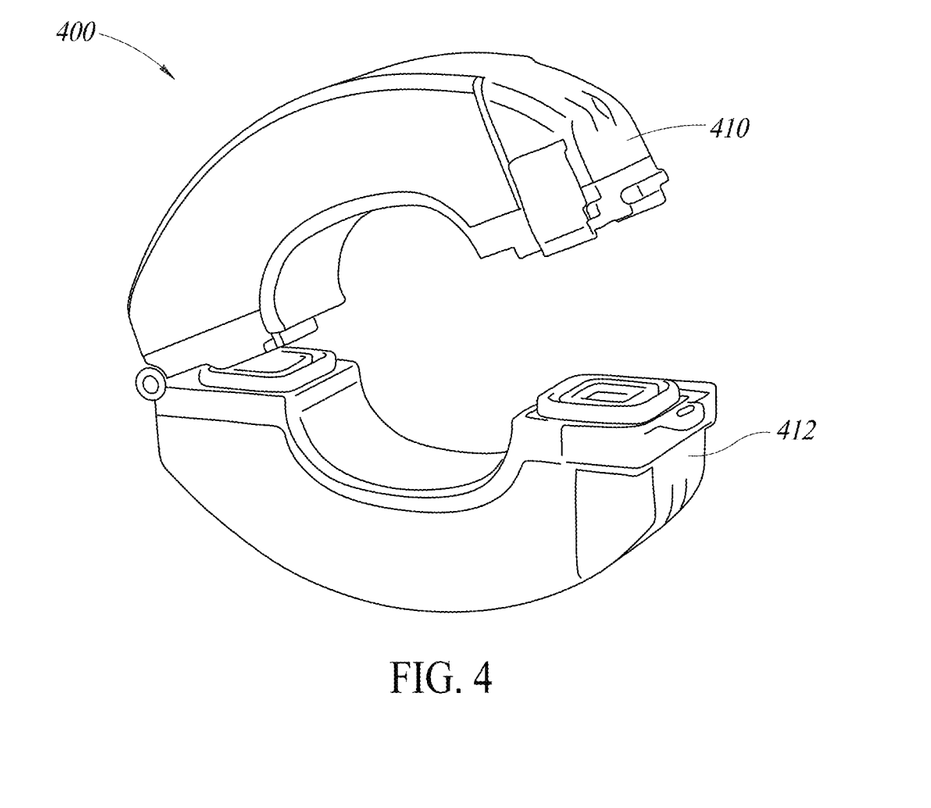
FIG. 4 is an illustration of an example split core CT.

FIG. 4 is an illustration of an example split core CT 400 that may be utilized to implement the CT 300 (see FIG. 3) so that the CT 300 may be installed without disconnecting or otherwise interrupting the AC main power flowing through the AC mains supply cable(s) 120 (see FIG. 1A). The split core CT 400 may be used to implement the CT(s) 130 (see FIG. 1A). Thus, the split core CT 400 may be used to implement the CT 210.

The split core CT 400 is configured for a measurement application. In this embodiment, the magnetic core 332 (see FIG. 3) includes a first portion 410 hingedly connected to a second portion 412. The first and second portions 410 and 412 of the magnetic core 332 (see FIG. 3) are able to be separated from one another and clamped around a current carrying conductor (e.g., the AC mains supply cable(s) 120 illustrated in FIG. 1A), which becomes the primary conductor 320 (see FIG. 3) of the split core CT 400. Referring to FIG. 3, if the magnetic core 332 is not split, the primary conductor 320 must be physically disconnected at one end so the magnetic core 332 can be placed around it. This adds to installation time, requires skilled crew, and requires that the primary conductor 320 (e.g., the AC mains supply cable(s) 120 illustrated in FIG. 1A) be temporarily taken offline to perform the work.

The secondary winding 310 however, may have a large number of coil turns wound on the magnetic core 332. Since the primary conductor 320 is typically a single turn, and low primary current is common, the magnetic core 332 may have a large cross-sectional area that captures sufficient magnetic flux given the low flux density. Additionally, the secondary winding 310 may require a large number of turns to most effectively couple the core flux to available secondary current. The secondary winding 310 may be constructed from small gauge wire to satisfy physical space constraints if a large number of turns is required.

The secondary winding 310 may supply current to either a short circuit, in the form of an ammeter or other measurement device (e.g., the CT monitor attached to the conductor 260 in FIG. 2), or a resistive load until the voltage induced in the secondary winding 310 is big enough to saturate the magnetic core 332 or cause failure from excessive voltage breakdown. The volt-amp VA rating of the CT 300 is directly related to the amount of power the CT 300 is able to produce.

Unlike a voltage transformer, the primary current of the CT 300 is not dependent on the secondary load current but instead is controlled by an external load (e.g., the active burden load 212 illustrated in FIG. 2). The secondary current is usually rated at a standard 1 ampere ("A") or 5 A for larger primary current ratings. By controlling the burden or external load dynamically, the maximum amount of power can be harvested from the CT 300 based on a given set of operating parameters.

Variable Burden Resistance

Referring to FIG. 2, the CT 210 requires that the active burden load 212 provide a certain amount of burden or resistance across the secondary output of the CT 210 to produce maximum power. It is beneficial for the active burden load 212 to change dynamically because impedance of the supporting circuitry 132 (see FIGS. 1A and 1B) changes based on operating conditions. This varying impedance affects the amount of power harvested by the CT 210. Electronic circuit temperatures, battery charge condition, and other external factors require changes be made to the active burden load 212 of the CT 210 to achieve optimum power. In conditions of high primary currents, the active burden load 212 also controls the amount of power distributed to the supporting circuitry 132 (see FIGS. 1A and 1B) and protects from over voltage situations. For the active burden load 212, the rectifier 220 is utilized. The rectifier 220 illustrated includes a pair of FETs each with a gate that is controlled by the microprocessor 140 (see FIG. 1A). In FIG. 2, the gates are connect to the microprocessor 140 (see FIG. 1A) by the PWM control 146 (see FIG. 1A) and the conductor 264.

Figure 5:
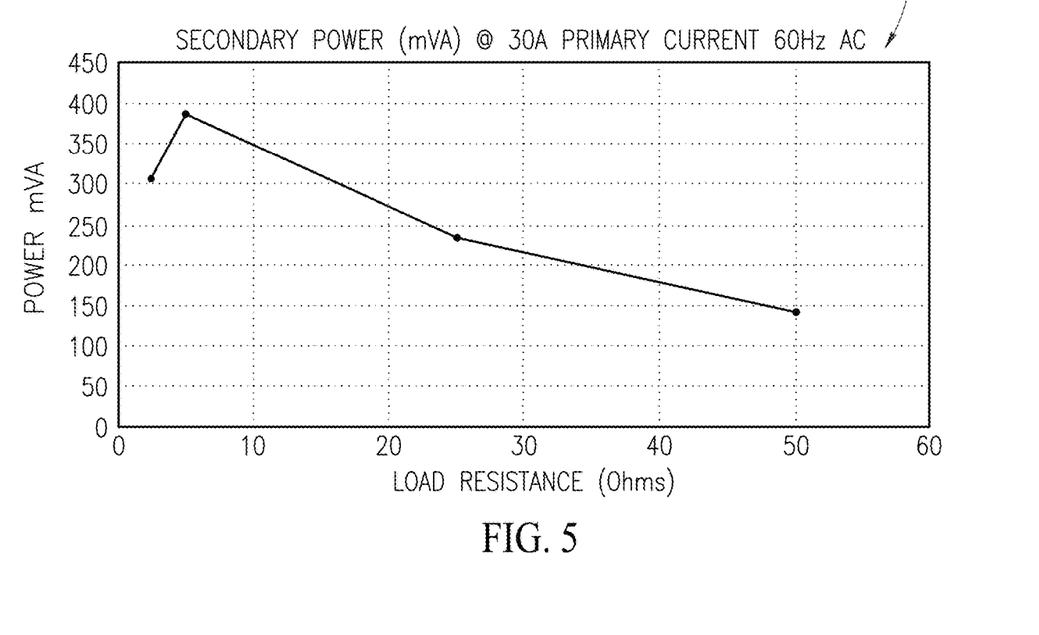
FIG. 5 is a plot of secondary power obtained for four load resistances placed across a secondary winding of a small test CT, with all other conditions held constant.

FIG. 5 is a plot 500 of secondary power versus load resistance. The plot 500 shows reactive power for four load resistances placed across the secondary winding (e.g., the secondary winding 310 illustrated in FIG. 3) of a small test CT, with all other conditions held constant. The plot 500 clearly shows the maximum power was delivered to the load (e.g., output load 150) between load resistances of 2.5 Ohms and 25 Ohms. A maximum power point tracker ("MPPT") may be used to actively control the load resistance (e.g., the active burden load 212 illustrated in FIG. 2) so that the maximum power is achieved based on the measured voltage across and current through the load (e.g., output load 150). The feedback loop 180 may include the MPPT. The custom firmware 148 (see FIG. 1A) may implement the MPPT and/or actively control the load resistance. Existing methods may be used to actively control the load resistance. Such existing methods are used widely for tracking maximum power in applications, such a photovoltaic power generation, and are not described in detail here.

Referring to FIG. 1B, a feedback control system (e.g., the feedback loop 180) may be used to manage the voltage-controlled variable burden (e.g., the active burden load 212 illustrated in FIG. 2). Referring to FIG. 2, when the gates of the rectifier 220 are ON, the output of the CT 210 is essentially shorted temporarily to ground. The amount of resistance of the active burden load 212 may be controlled by adjusting the ON and OFF times of the gates via the microprocessor 140 (see FIG. 1A). Referring to FIG. 1A, predefined algorithms within the firmware 148 determine the optimum ON/OFF times of the gates to achieve the maximum power point for the supporting circuitry 132 based on immediate operating conditions. Such a feedback control system (e.g., the feedback loop 180 illustrated in FIG. 1B) may be controlled by the PWM control 146, the DAC 144, or another device or method.

Rectifier

Referring to FIG. 2, the rectifier 220 is an electronic device or circuit that converts AC to DC. DC power is primarily used in electronic circuits and is also needed to charge batteries or other storage mediums. There are numerous circuit designs that accomplish this conversion but many are problematic in this scenario. When utilizing the CT 210 to harvest power, the secondary voltage is generally very small and usually less than 2.5 volts ("v") peak AC at a primary current of 10 Amperes ("A"). With the voltage drop associated with typical rectifier circuit designs, the rectified DC voltage would be less than 1.5 v DC. After the addition of bulk capacitance to smooth out the DC waveform, the voltage could be less than 800 millivolts ("mv") DC. This creates issues regarding circuit start up due to the extremely low voltage.

Figure 6:
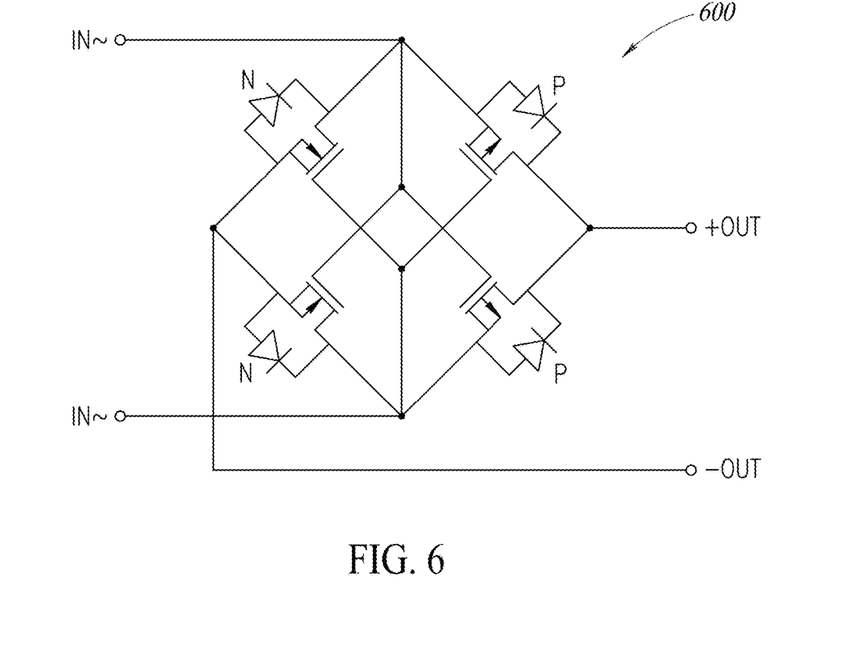
FIG. 6 is a schematic of a full-wave rectifier that may be used to implement a rectifier of the assembly illustrated in FIG. 2.

FIG. 6 is a schematic of a full wave rectification circuit or a full-wave rectifier 600 that may be used to implement the rectifier 220 (see FIG. 2). The full-wave rectifier 600 is configured to provide an ultra low voltage drop and much higher rectified DC voltages than typical rectifier circuit designs. Depending on the properties of the FETs chosen, the voltage drop during the rectification stage may be as low as 40 my as compared to an approximately 1 v voltage drop observed in more traditional rectifier circuit designs. This provides almost three times the available rectified DC voltage based on a given AC input, results in higher efficiency, and eliminates circuit start up issues due to low voltage. However, it is understood that other types of high-efficiency rectifiers or low efficiency like half-wave rectifiers may also be used depending on the demands of a given application.

Boost Converter

Figure 7:
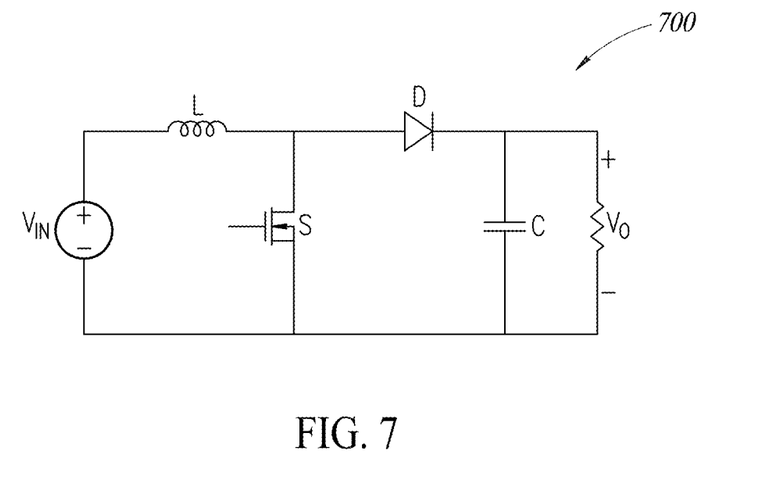
FIG. 7 is a schematic of a boost converter that may be used to implement a boost converter of the assembly illustrated in FIG. 2.

FIG. 7 is a schematic of a boost converter 700 that may be used to implement the boost converter 280 (see FIG. 2). A boost converter, like the example boost converter 700 provided in FIG. 7, is utilized to step up the voltage from a lower value (e.g., approximately 2.5 v DC to approximately 3 v DC) to a higher value (e.g., approximately 5 v DC) during typical operation (e.g., at 10 A of primary current). This boost step is needed to supply power to the output load 150 (see FIGS. 1A-2). The use of a boost converter also provides the ability to operate with a primary current as low as 5 A or less when the output of the CT, once rectified, could be as low as 0.5 V DC and the circuit (e.g., the supporting circuitry 132) will still operate reliably. Referring to FIG. 2, the boost converter 280 is configured in a constant current ("CC") mode of operation and the microprocessor 140 (see FIG. 1A) controls the feedback loop 180 (see FIG. 1B).

Energy Storage

For energy storage, referring to FIG. 1A, the energy storage medium 152 may be implemented as a single cell or multiple cell battery or battery pack. Alternatively or in addition to one or more batteries, the energy storage medium 152 may include one or more super capacitors or other type of storage medium configured to store power.

Microprocessor with Firmware

The microprocessor 140 with the firmware 148 may be utilized to control the operation of at least a portion of the system 100. Overall system conditions, such as the charge state of the energy storage medium 152, the power output of the CT(s) 130, and others system parameters and/or measurements, may be analyzed occasionally (e.g., periodically) or in real time and system adjustments made to achieve maximum power production. For example, referring to FIG. 2, the microprocessor 140 may change the active burden load 212 across the output terminals of the CT 210 in combination with the feedback loop 180 (see FIG. 1B) of the boost converter 280 to achieve an optimum or maximum power point based on a given set of conditions. Various other system parameters may be analyzed and adjustments made in real time. Referring to FIG. 1A, such system parameters may include, for example, state of charge, temperature, and/or number of charge/discharge cycles of the energy storage medium 152 (e.g., one or more batteries, one or more energy storage devices, and the like). By way of other non-limiting examples, the system parameters may include ambient air temperature, input power, output power, boost ratio, variable burden resistance, charge current, and boost converter feedback loop voltage. The modified output parameters may include active burden load resistance, boot strap condition, and feedback loop control voltage to achieve the highest level of power to charge the energy storage medium 152 or provide power to other electronics (e.g., the remotely installed electronic device 110). Some of the active control functions of the microprocessor 140 are described in more detail below.

Burden Resistance Control

The firmware 148 executed by the microprocessor 140 may actively change or adjust the resistance of the active burden load 212 (see FIG. 2) such that maximum power is transferred to the output load 150. The microprocessor 140 may vary input parameters based on the methods used. For example, the microprocessor 140 may vary input parameters based on a measurement of DC current presented to the output load 150 after power conditioning. The microprocessor 140 may collect this measurement at regular intervals. The microprocessor 140 may assume voltage is relatively constant after power conditioning, allowing the microprocessor 140 to assume a current measurement is proportional to power.

Overload Control

Referring to FIG. 2, when the CT 210 is capable of producing more power than is needed due to a large current in the primary conductor (e.g., the AC mains supply cable(s) 120) or other factors, the firmware 148 (see FIG. 1A) may change the active burden load 212 (see FIG. 2) to provide less than the maximum power possible and instead match the power requirements of the system 100. Such other factors may include the energy storage medium 152 (e.g., a battery) nearing 100% SoC. The amount of power needed includes all of the power needed by those components of the system 100 other than the AC mains supply cable(s) 120.

At least one embodiment of the disclosure can be described in view of the following clauses:

1. An assembly for harvesting power from one or more power cables, the assembly comprising:

a current transformer with an active burden load, the current transformer being configured to harvest power from the one or more power cables and output the harvested power as alternating current;

a rectifier connected to the current transformer, the rectifier being configured to receive the alternating current from the current transformer and output direct current;

a controller configured to send a load control signal to the current transformer, the current transformer being configured to modify the active burden load based on an amount of load encoded in the load control signal;

an input monitor configured to monitor the direct current output by the rectifier and send an input signal to the controller encoding at least one first property of the direct current output by the rectifier;

a converter configured to receive the direct current and output electricity to a load, the controller being configured to send an output signal to the converter encoding an amount of electrical output, the converter being configured to output the electricity in accordance with the output signal; and an output monitor configured to encode, as an output load signal, at least one second property of the electricity after the electricity passes through the load and send the output load signal to the controller, the controller being configured to determine the amount of electrical output and the amount of load based on the input signal and the output load signal, the controller being configured to encode the amount of electrical output in the output signal, and to encode the amount of load in the load control signal.

2. The assembly of clause 1, wherein the current transformer is a split core current transformer.

3. The assembly of clause 1 or 2, wherein the current transformer is a solid core current transformer.

4. The assembly of any one of clauses 1-3, further comprising:
a filtering circuit configured to filter the direct current before the direct current is received by the converter.

5. The assembly of any one of clauses 1-4, further comprising:
an energy storage medium; and
a boot strap component configured to use power from the energy storage medium to power the converter until the converter stabilizes.

6. The assembly of any one of clauses 1-5, wherein the rectifier is a full wave metal-oxide-semiconductor field-effect transistor ("MOSFET") bridge rectifier.

7. The assembly of clause 6, wherein the full wave MOSFET bridge rectifier comprises a first MOSFET with a first gate and a second MOSFET with a second gate,
the first and second gates are each connected to the controller, and
the controller is operable to turn the first and second gates "ON" and "OFF" to thereby modify the active burden load.

8. The assembly of any one of clauses 1-7, wherein the converter is a boost converter.

9. The assembly of any one of clauses 1-8, wherein the converter is a buck converter.

10. An assembly for harvesting power from one or more power cables and providing the harvested power to a remotely installed electronic device, the assembly comprising:
a current transformer operable to harvest power from the one or more power cables and output the harvested power to the remotely installed electronic device;
at least one output monitor each operable to encode, in a load signal, at least one property of a portion of the harvested power that passed through the remotely installed electronic device; and
a controller operable to receive the load signal from each of the at least one output monitor and control an amount of power harvested by the current transformer based at least in part on the load signal received from each of the at least one output monitor.

11. The assembly of clause 10, wherein the current transformer outputs the harvested power as alternating current, and the assembly further comprises:
a circuit operable to connect the current transformer to the remotely installed electronic device, the circuit being operable to convert the alternating current to direct current.

12. The assembly of clause 11, wherein the circuit comprises:
a rectifier circuit operable to receive the alternating current from the current transformer and output the direct current;
a filter circuit operable to receive the direct current from the rectifier circuit and filter the direct current; and
a converter circuit operable to receive the direct current from the filter circuit and output the direct current to the remotely installed electronic device.

13. The assembly of clause 12, wherein the controller is operable to send an output signal to the converter circuit encoding an amount of electrical output, and the converter circuit is operable to output the direct current in accordance with the output signal.

14. The assembly of clause 13, wherein the circuit further comprises an input monitor operable to receive the direct current from the rectifier circuit and send an input signal to the controller encoding at least one property of the direct current, and
the controller is operable to determine the amount of electrical output based on the input signal and the load signal received from each of the at least one output monitor.

15. The assembly of any one of clauses 12-14, further comprising:
an energy storage medium; and
a boot strap component operable to use power from the energy storage medium to power the converter circuit until the converter circuit stabilizes.

16. The assembly of any one of clauses 12-15, wherein the converter circuit comprises a boost converter.

17. The assembly of any one of clauses 12-16, wherein the converter circuit comprises a buck converter.

18. The assembly of any one of clauses 12-17, wherein the current transformer is connected to an active burden load,
the controller is operable to determine an amount of load provided by the active burden load,
the amount of load determines the amount of power harvested by the current transformer,
the rectifier circuit comprises at least one metal-oxide-semiconductor field-effect transistor ("MOSFET") each having a gate,
the gate of each of the at least one MOSFET is connected to the controller, and
the controller is operable to turn the gate of each of the at least one MOSFET "ON" and "OFF" to thereby modify the amount of load.

19. The assembly of any one of clauses 12-17, wherein the current transformer is connected to an active burden load,
the controller is operable to determine an amount of load based at least in part on the load signal received from each of the at least one output monitor, encode the amount of load in a load control signal, and send the load control signal to the current transformer, and
the current transformer is operable to receive the load control signal and modify the active burden load based on the amount of load encoded in the load control signal.

20. The assembly of clause 10, wherein the current transformer outputs the harvested power as alternating current,
the assembly further comprises a rectifier circuit, input monitor, and a converter circuit,
the rectifier circuit is operable to receive the alternating current from the current transformer and output the direct current,
the input monitor is operable to monitor the direct current output by the rectifier circuit and send an input signal to the controller encoding at least one property of the direct current,
the converter circuit is operable to receive the direct current output by the rectifier circuit, receive an output signal from the controller, and output the direct current to the remotely installed electronic device in accordance with the output signal,
the controller is operable to determine an amount of electrical output based on the input signal and the load signal received from each of the at least one output monitor, and
the controller is operable to send the output signal to the converter circuit encoding the amount of electrical output.

21. The assembly of clause 20, wherein the current transformer is connected to an active burden load, the controller is operable to determine an amount of load based on the input signal and the load signal received from each of the at least one output monitor, encode the amount of load in a load control signal, and send the load control signal to the current transformer, and the current transformer is operable to receive the load control signal and modify the active burden load based on the amount of load encoded in the load control signal.

22. The assembly of clause 21, wherein the at least one property of the direct current encoded in the input signal by the input monitor comprises current and voltage.

23. The assembly of clause 22, wherein the at least one output monitor comprises a current monitor operable to encode, in a first load signal, an amount of current in the portion of the harvested power, and the at least one output monitor comprises a voltage monitor operable to encode, in a second load signal, an amount of voltage in the portion of the harvested power.

24. The assembly of any one of clauses 10-23, wherein the current transformer is a split core current transformer or a solid core current transformer.

25. The assembly of any one of clauses 10-24, further comprising:

a current transformer monitor operable to monitor an amount of power harvested from the one or more power cables by the current transformer and send a signal to the controller encoding the amount of power harvested.

26. The assembly of any one of clauses 10-25, wherein the at least one output monitor comprises a current monitor operable to encode, in a first load signal, an amount of current in the portion of the harvested power, and the at least one output monitor comprises a voltage monitor operable to encode, in a second load signal, an amount of voltage in the portion of the harvested power.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B, and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

Accordingly, the invention is not limited except as by the appended claims.

The invention claimed is:

1. An assembly for harvesting power from one or more power cables, the assembly comprising:
a current transformer with an active burden load, the current transformer to harvest power from the one or more power cables and output the harvested power as alternating current;
a rectifier connected to the current transformer in parallel with the active burden load, the rectifier to receive the alternating current from the current transformer and output direct current;
a controller to send a load control signal to the current transformer, the current transformer to modify the active burden load based on an amount of load encoded in the load control signal;

an input monitor to monitor the direct current output by the rectifier and send an input signal to the controller encoding at least one first property of the direct current output by the rectifier;

a converter to receive the direct current and output electricity to a load, the controller to send an output signal to the converter encoding an amount of electrical output, the converter to output the electricity in accordance with the output signal; and an output monitor to encode, as an output load signal, at least one second property of the electricity after the electricity passes through the load and send the output load signal to the controller, the controller to determine the amount of electrical output and the amount of load based on the input signal and the output load signal, the controller to encode the amount of electrical output in the output signal, and to encode the amount of load in the load control signal.

2. The assembly of claim 1, wherein the current transformer is a split core current transformer.

3. The assembly of claim 1, wherein the current transformer is a solid core current transformer.

4. The assembly of claim 1, further comprising:
a filtering circuit configured to filter the direct current before the direct current is received by the converter.

5. The assembly of claim 1, further comprising:
an energy storage medium; and
a boot strap component configured to use power from the energy storage medium to power the converter until the converter stabilizes.

6. The assembly of claim 1, wherein the rectifier is a full wave metal-oxide-semiconductor field-effect transistor ("MOSFET") bridge rectifier.

7. The assembly of claim 6, wherein the full wave MOSFET bridge rectifier comprises a first MOSFET with a first gate and a second MOSFET with a second gate,
the first and second gates are each connected to the controller, and
the controller is operable to turn the first and second gates "ON" and "OFF" to thereby modify the active burden load.

8. The assembly of claim 1, wherein the converter is a boost converter.

9. The assembly of claim 1, wherein the converter is a buck converter.

10. An assembly for harvesting power from one or more power cables and providing the harvested power to a remotely installed electronic device, the assembly comprising:
a current transformer comprising output terminals and being operable to harvest power from the one or more power cables and output the harvested power to the remotely installed electronic device;
a variable load connected across the output terminals of the current transformer;
at least one output monitor each operable to encode, in a load signal, at least one property of a portion of the harvested power that passed through the remotely installed electronic device; and
a controller operable to receive the load signal from each of the at least one output monitor and control an amount of load applied by the variable load to thereby control an amount of power harvested by the current transformer based at least in part on the load signal received from each of the at least one output monitor.

11. The assembly of claim 10, wherein the current transformer outputs the harvested power as alternating current, and the assembly further comprises:
a circuit operable to connect the current transformer to the remotely installed electronic device, the circuit being operable to convert the alternating current to direct current.

12. The assembly of claim 11, wherein the circuit comprises:
a rectifier circuit operable to receive the alternating current from the current transformer and output the direct current;
a filter circuit operable to receive the direct current from the rectifier circuit and filter the direct current; and
a converter circuit operable to receive the direct current from the filter circuit and output the direct current to the remotely installed electronic device.

13. The assembly of claim 12, wherein the controller is operable to send an output signal to the converter circuit encoding an amount of electrical output, and
the converter circuit is operable to output the direct current in accordance with the output signal.

14. The assembly of claim 13, wherein the circuit further comprises an input monitor operable to receive the direct current from the rectifier circuit and send an input signal to the controller encoding at least one property of the direct current, and
the controller is operable to determine the amount of electrical output based on the input signal and the load signal received from each of the at least one output monitor.

15. The assembly of claim 12, further comprising:
an energy storage medium; and
a boot strap component operable to use power from the energy storage medium to power the converter circuit until the converter circuit stabilizes.

16. The assembly of claim 12, wherein the converter circuit comprises a boost converter.

17. The assembly of claim 12, wherein the converter circuit comprises a buck converter.

18. The assembly of claim 12, wherein the rectifier circuit comprises at least one metal-oxide-semiconductor field-effect transistor ("MOSFET") each having a gate,
the gate of each of the at least one MOSFET is connected to the controller, and
the controller is operable to turn the gate of each of the at least one MOSFET "ON" and "OFF" to thereby modify the amount of load.

19. The assembly of claim 12, wherein the controller is operable to determine a load amount based at least in part on the load signal received from each of the at least one output monitor, encode the load amount in a load control signal, and send the load control signal to the current transformer, and
the current transformer is operable to receive the load control signal and modify the amount of load based on the load amount encoded in the load control signal.

20. The assembly of claim 10, wherein the current transformer outputs the harvested power as alternating current,
the assembly further comprises a rectifier circuit, input monitor, and a converter circuit,
the rectifier circuit is operable to receive the alternating current from the current transformer and output direct current, the input monitor is operable to monitor the direct current output by the rectifier circuit and send an input signal to the controller encoding at least one property of the direct current, the converter circuit is operable to receive the direct current output by the rectifier circuit, receive an output signal from the controller, and output the direct current to the remotely installed electronic device in accordance with the output signal, the controller is operable to determine an amount of electrical output based on the input signal and the load signal received from each of the at least one output monitor, and the controller is operable to send the output signal to the converter circuit encoding the amount of electrical output.

21. The assembly of claim 20, wherein the controller is operable to determine a load amount based on the input signal and the load signal received from each of the at least one output monitor, encode the load amount in a load control signal, and send the load control signal to the current transformer, and the current transformer is operable to receive the load control signal and modify the amount of load based on the load amount encoded in the load control signal.

22. The assembly of claim 21, wherein the at least one property of the direct current encoded in the input signal by the input monitor comprises current and voltage.

23. The assembly of claim 22, wherein the at least one output monitor comprises a current monitor operable to encode, in a first load signal, an amount of current in the portion of the harvested power, and the at least one output monitor comprises a voltage monitor operable to encode, in a second load signal, an amount of voltage in the portion of the harvested power.

24. The assembly of claim 10, wherein the current transformer is a split core current transformer or a solid core current transformer.

25. The assembly of claim 10, further comprising:

a current transformer monitor operable to monitor an amount of power harvested from the one or more power cables by the current transformer and send a signal to the controller encoding the amount of power harvested.

26. The assembly of claim 10, wherein the at least one output monitor comprises a current monitor operable to encode, in a first load signal, an amount of current in the portion of the harvested power, and the at least one output monitor comprises a voltage monitor operable to encode, in a second load signal, an amount of voltage in the portion of the harvested power.

* * * * *